April 9, 1935.  D. R. HILLIS  1,997,406
FEEDER FOR PROGRESSIVE LUBRICATING SYSTEMS
Filed May 12, 1930  2 Sheets-Sheet 1
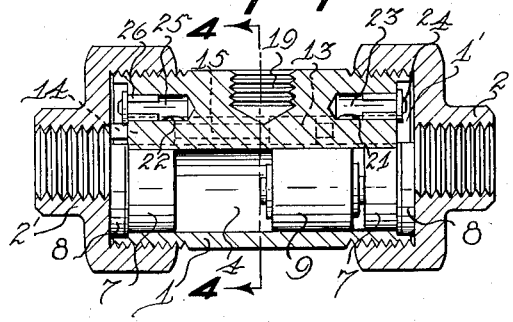
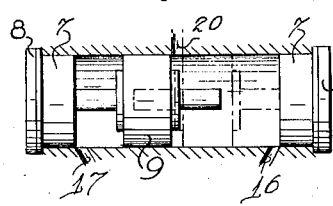 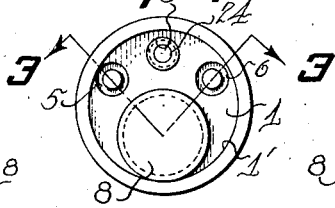 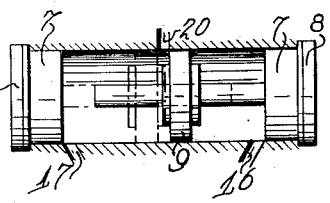
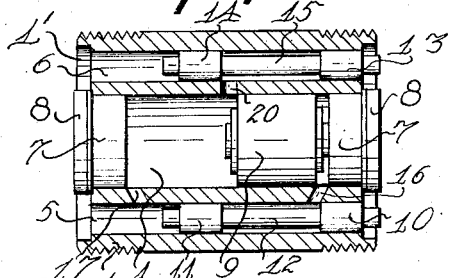
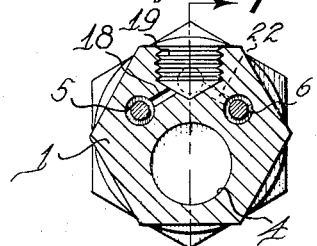
INVENTOR
David R. Hillis
BY
ATTORNEYS April 9, 1935.  D. R. HILLIS  1,997,406
FEEDER FOR PROGRESSIVE LUBRICATING SYSTEMS
Filed May 12, 1930  2 Sheets-Sheet 2
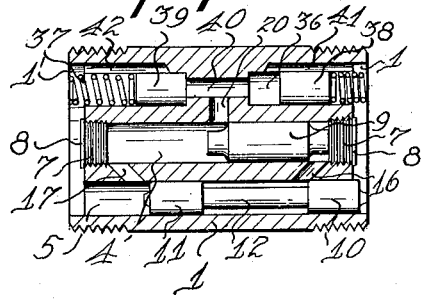
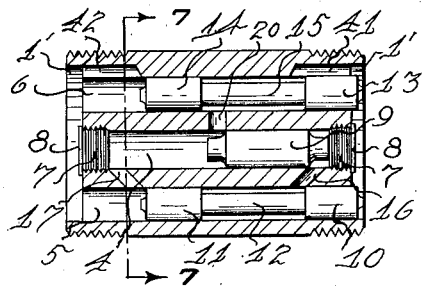
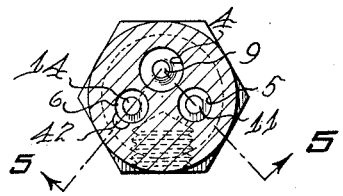
INVENTOR
David R. Hillis Patented Apr. 9, 1935

1,997,406

UNITED STATES PATENT OFFICE 1,997,406

FEEDER FOR PROGRESSIVE LUBRICATING SYSTEMS

David R. Hillis, Detroit, Mich., assignor to Lubricating Equipment Co., Detroit, Mich., a corporation of Michigan Application May 12, 1930, Serial No. 451,707

17 Claims. (Cl. 184—7)

The present invention relates to a feeder for a lubricating system of the single pipe line type.

The main object of the invention is to provide a feeder for a lubricating system in which a circuit from a reservoir equipment pumping means is connected to a number of bearings and back to said reservoir by a pipe line, said pumping means being adapted to pump lubricant alternately or at will, first in one direction and then in the other so that the lubricant will be forced into the feeder from one direction of flow from said pipe line and cause said feeder to discharge lubricant into the bearing to which it is connected before permitting the lubricant to pass out to the next feeder.

Another object is the provision in such a feeder of a means for delivering a measured quantity of lubricant to each bearing.

Another object is the provision in such a feeder of a means for varying the capacity of the measuring chamber.

The invention is fully disclosed by way of example in the following description and in the accompanying drawings in which Figure 1 is a sectional view of a feeder taken on the line 1—1 of Fig. 4;

Fig. 2 is an end view of a feeder with caps removed;

Fig. 3 is a sectional view of a feeder taken on the line 3—3 of Fig. 2;

Fig. 4 is a sectional view of a feeder taken on the line 4—4 of Fig. 1;

Fig. 5 is a sectional view of a modified form of feeder with caps removed;

Fig. 6 is a corresponding view to Fig. 5 showing another modification of a feeder;

Fig. 7 is a sectional view of a feeder taken on the line 7—7 of Fig. 6, and

Figs. 8 and 9 are sectional views of the cylindrical measuring chamber of the feeder showing how the pistons may be varied in size to lessen the amount of lubricant to be discharged from the feeder.

Reference to these views in which like characters are employed to designate like parts throughout will now be made.

The feeder comprises a body portion 1 which may be of any shape. It is preferably hexed to make it easily held when attaching the pierced caps or nuts 2 and 2', which are screwed thereon and which have internally threaded projections adapted for connection to a pipe line.

The body portion 1 is recessed as at 1' for purposes hereinafter described and it is bored as shown more clearly in Figs. 3, 5 and 6 so as to form three cylindrical passageways through it; one of these passageways is larger than the other two, and the largest one serves as the side walls of a measuring chamber which I have designated 4, and the other two serve as valve chambers, one of which I have designated as 5 and the other as 6.

The side walls of the measuring chamber are closed by plugs 7 which, in the preferred form, are provided with suitable sealing means and enlarged heads 8, and said heads contact with the nuts 2 and are held in place thereby. In the other forms illustrated the plugs 7 are screwthreaded as are the ends of the chamber thus permitting them to be screwed thereinto and their heads do not need to abut against the cap.

Slidably mounted in the measuring chamber is a piston 9 having axial extending portions permitting fluid pressure to act on the piston when said extension abuts against either plug 7. As shown in Figs. 8 and 9 the capacity of the measuring chamber may be varied by varying the size of the pistons and their extensions.

Mounted in the valve chamber 5 is a slide valve of the dumbbell type having a head 10 provided with an extending portion of lesser diameter which is adapted to project into the chamber created by the recess 1' and to abut against the cap when the valve slides toward the cap on that side, and said dumbbell valve has a similar head 11 provided with a similar extension on its other end, the connecting portion between said heads 10 and 11, being of less diameter than said heads, is designated as 12.

In the preferred form illustrated in Figs. 1, 2, 3 and 4, the valve chamber 6 is provided with a similar dumbbell valve having one head 13 and another one 14 and the connecting portion is designated as 15.

The valve chamber 5 communicates with the measuring chamber 4 at one end thereof through a duct 16, and at the other end through a duct 17, and as shown in Fig. 4, the valve chamber 5 also has a discharge port 18, which leads to the bearing through any suitable connection. I have shown the body portion provided with a screwthreaded connection 19 communicating with the discharge port 18 and it is adapted to receive a fitting or other connection to a bearing.

The valve chamber 6 has a duct 20 communicating with the measuring chamber 4 centrally thereof and each end of said valve chamber 6 is provided with a bypass. In the preferred form illustrated on Figs. 1, 2, 3 and 4, the bypass consists of ducts and valve chambers communicating with the chamber created between the caps and the recessed portions 1' of the main body portion. I have designated one of these ducts 21, and the other as 22 as will be seen in Fig. 1, where the valve chamber 6 and its dumbbell valves 13, 14 and 15 are shown in dotted lines. The duct 21 leads to valve chamber 23, which is closed by a pressure operated headed check valve 24 having an axial projection or stop lug, and the duct 22 leads to a valve chamber 25 closed by a similar check valve 26.

In Figs. 5, 6 and 7 the main features are the same although they differ in size and dimension and the valve means and bypass means differ somewhat.

In Fig. 5 I have shown a form of the invention in which, in lieu of the cylindrical valve chamber 6, I provide a valve chamber 36 at one end and a valve chamber 37 at the other end of the main body portion in which I mount spring pressed slide valves 38 and 38 respectively, and said valve chambers have an intercommunicating port 40 communicating with the duct 20.

The valve chamber 36 has a bypass duct 41 permitting lubricant to flow from the passage 40 to the chamber created between the cap and the main body portion by the recess 1', when the valve 38 is forced off its seat, and the valve chamber 37 has a similar duct 42.

In Fig. 6 I have shown a form of the invention that differs from the preferred form in that the bypasses 41 and 42 are similar to those of Fig. 5 except that they are of slightly less length so as to accommodate the type of valve used, but the valve chamber 6 and the valve therein is the same as that of Figs. 1, 2, 3 and 4.

The operation of the feeder is as follows, considering first the preferred form:—

Lubricant is forced through the pierced cap 2 of Fig. 1 and passes into the chamber made by the recessed portion 1' of the main body portion and the cap 2, and while the lubricant pressure forces the valve 24 to its seat thus blocking admittance to the valve chamber 23, it also forces both dumbbell valves toward the cap 2' each then being in the position shown in dotted lines in Fig. 1. Such movement of the valves causes the valve head 10 to pass beyond the duct 16 and the valve head 11 to pass beyond the duct 17, permitting the lubricant entering valve chamber 5 under pressure to flow into the measuring chamber, which forces the piston 9 to close the duct 20 and to discharge lubricant on the other side of said piston in the measuring chamber through duct 17 between valve heads 11 and 10 and out through the outlet port 18 into the bearing member screwed into the connecting portion 19.

When the piston 9 has completed its discharge stroke it opens the duct 20 to the valve chamber 6 and the lubricant under pressure entering through cap 2 continues its flow around the connecting portion 15 of the dumbbell valve and between the heads 13 and 14, from whence it passes through duct 22 into valve chamber 25 and forces valve 26 off its seat, and it then is free to pass and does pass through the pierced cap 2' into the pipe line or other fluid conveying means connected therewith.

When pressure entering cap 2 is relieved, the piston 9 will abut against the plug 7 nearest cap 2' and lubricant will be left in the chamber on the other side of the piston. When it is desired to lubricate again lubricant under pressure is forced through cap 2' which will pass into chamber 5 and through duct 17 into the measuring chamber 4, force piston 9 toward cap 2 causing it to discharge lubricant through duct 16 and into chamber 5 between valve heads 10 and 11 and through outlet port 18 to bearing, and will then permit the lubricant under pressure to flow through duct 20 and into valve chamber 6 between valve heads 13 and 14 and through duct 21 into valve chamber 23 to open a valve 24 and flow by it and through the pierced cap 2.

The operation is the same in the forms shown in Figs. 5, 6 and 7, except that the ducts 41 and 42 are substituted for the valve chambers 23 and 25, and the ducts are closed by the valves 38 and 39 in Fig. 5 and by the valve heads 13 and 14 in Fig. 6 rather than by the separate valves 24 and 26.

In the form shown in Fig. 5 springs normally keep valves 38 and 39 on their seats so as to prohibit lubricant passing directly into the central valve passage 40 from either cap, and as the pressure entering cap 2 will aid the spring in holding valve 38 on its seat, valve 39 will be forced off its seat by pressure of the lubricant coming through the feeder from cap 2 and through the various passageways to duct 20 and chamber 40; the reverse should be self evident.

While I have described the preferred embodiments of my invention it is to be understood that it is capable of other adaptations and modifications within the scope of the appended claims.

What I claim is:

1. In combination, a feeder of the character described comprising a cylinder, a piston reciprocable in said cylinder, a plurality of inlet ports adapted for connection to a fluid conveying means, a valve controlled passageway communicating with said cylinder near each end thereof, a discharge port communicating with said valve controlled passageway and adapted for connection to a bearing, and valve controlled bypass means communicating with said cylinder and with each connection to the fluid conveying means adapted to direct lubricant entering said device through one inlet port to the fluid conveying means connected to the other inlet port.

2. A lubricating device comprising a body provided with a delivery port adapted for connection to a bearing and a plurality of ports adapted for connection to a conduit capable of delivering lubricant thereto under pressure, pressure operated means for delivering to a bearing a predetermined quantity of lubricant received through any one of the ports connected to said conduit, and means for directing lubricant under pressure to flow through said device to the conduit connected to another of the ports after forcing lubricant into the bearing to which the device is connected.

3. A lubricating device comprising a body provided with a delivery port adapted for connection to a bearing and a plurality of ports adapted for connection to a conduit for delivering lubricant thereto and therefrom under pressure, pressure operated means for delivering to a bearing a predetermined quantity of lubricant entering said device through any of the said plurality of ports, and means for directing lubricant under pressure to flow through said device to another of said plurality of ports after forcing lubricant into the bearing to which the device is connected, said device being adapted to function when the lubricant is forced therethrough from either direction of flow in the conduit to which it is to be attached.

4. A lubricating device comprising a body provided with a delivery port, a plurality of ports adapted for connection to a lubricating conveying means for delivering lubricant under pressure to said device and for conveying lubricant therefrom, a cylinder, a piston in said cylinder, communicating passageways connecting said cylinder with said plurality of ports and communicating with said delivery port, and valve means controlling the lubricant supplied to said device under pressure, a second communicating passageway connecting said plurality of ports and communicating with said cylinder in such manner that after the cylinder has discharged its predetermined quantity of lubricant, the continued pressure on the lubricant will force lubricant out of said cylinder and into said second passageway, valve means adapted to block said second passageway to the flow of lubricant entering through any one of the plurality of ports and to direct lubricant flowing into said second passageway from said cylinder to pass out of one of said plurality of ports which is not then acting as an inlet port.

5. A lubricating device comprising a body provided with a delivery port, a plurality of ports adapted for connection to a lubricant conveying means for delivering lubricant thereto under pressure and for conveying lubricant therefrom, a cylinder and a piston in said cylinder, a communicating passageway connecting said plurality of ports and communicating with said delivery port, a duct at each end of said cylinder communicating with said communicating passageway, valve means in said communicating passageway controlling the lubricant supplied to said device under pressure, a second communicating passageway connecting said plurality of ports, a duct connecting said second communicating passageway with said cylinder, and valve controlled means adapted to block said second communicating passageway to the flow of lubricant entering through any of said ports and to direct lubricant entering said second passageway from said cylinder to pass from the device into the lubricant conveying means.

6. A feeder for lubricating bearings comprising a body having a cylinder, a piston reciprocable in said cylinder, said body having two openings each serving alternately as loading and discharge openings to a lubricant conveying means capable of conducting lubricant under pressure in any direction, a valve chamber connecting said openings, ducts at each end of said cylinder communicating with said valve chamber, and a discharge port communicating with said valve chamber and adapted for connection to a bearing, valve means adapted to direct lubricant under pressure entering either one of said openings to flow through said valve chamber and through one of said ducts into said cylinder on one side of said piston and to direct lubricant being discharged from the other side of said piston to flow through said other duct and into said valve chamber and out through the discharge port, a second valve chamber connecting said openings, and communicating with said cylinder, a duct near each end of said second valve chamber communicating with each opening, and valve means adapted to close said valve chamber and ducts to the direct and continuous flow of lubricant therethrough, and adapted to direct lubricant entering said valve chamber from said cylinder to flow through the duct and opening opposite the one through which lubricant is entering the device.

7. A lubricating device comprising a main body portion having a delivery port, a plurality of inlet ports adapted for connection to a source of lubricant supply capable of delivering lubricant under pressure, a measuring chamber adapted to deliver a predetermined quantity of lubricant to a bearing, means for varying the capacity of said measuring chamber, communicating passageways between said inlet ports, said measuring chamber and said delivery port, valve means controlling the lubricant supplied to said device under pressure for directing said lubricant into said measuring chamber, another communicating passageway between said inlet ports, a duct communicating with said measuring chamber and said last named passageway, and valve means blocking the continuous and direct flow of lubricant through said last mentioned passageway from either inlet port and directing lubricant entering said last mentioned passageway from said measuring chamber to pass through said passageway to the other inlet connection to the source of supply on the other side of said passageway from that through which the lubricant is entering under pressure.

8. A lubricating device adapted for application to a system wherein lubricant may flow in either direction through a lubricant conveying means forming a circuit from a source of supply to a plurality of bearings and back to said source of supply, comprising in combination a body member having a plurality of inlets and outlets adapted for connection to the lubricant conveying means and a discharge port adapted for connection to a bearing, a cylinder for lubricant within said body, a piston within said cylinder, inlet and outlet ducts to said cylinder, a cylindrical connecting passage between said inlet and outlet ducts and communicating with said body member inlets and outlets and with the discharge port to the bearing, and a piston valve in said cylindrical connecting passage for controlling by pressure on the lubricant the alternate flow of lubricant into said cylinder and the filling of said cylinder on each side of said piston, and for controlling the alternate discharge of lubricant into the bearing from each side of said piston, a second cylindrical connecting passageway between the body member inlets and outlets to the lubricant conveying means and communicating with said cylinder, a by-pass duct near each end of said second cylindrical connecting passage communicating therewith and with the body member inlet and outlet adjacent the end of said passage, valve means adapted to close said cylindrical connecting passage to the inflow of lubricant from the lubricant conveying means and to direct lubricant flowing out of the cylinder, after the cylinder has discharged lubricant to the bearing, to flow through the by-pass leading to the outlet to the lubricant conveying means.

9. A lubrication controlling device adapted for attachment to a single-supply line piping system forming a circuit for connecting a supply of lubricant under pressure with a plurality of bearings in such manner that lubricant may flow through said device when the pressure is applied to cause flow of lubricant in the line in either direction, comprising a body member having a single discharge outlet to the bearing and two ports, one of which serves as an inlet to the device and the other as an outlet to the line and vice versa depending upon the direction of flow of lubricant in the line, a cylindrical passage connecting said body member inlets and communicating with said body member discharge outlet, a cylinder within said body member, a pressure-actuated piston within said cylinder, ducts in the body member communicating with said cylinder and with said cylindrical passage, said ducts serving alternately as inlet and outlet ducts in filling said cylinder and in discharging lubricant therefrom, a pressure-actuated piston valve of dumb-bell pattern in said cylindrical passage and interposed between said body member inlets, said piston valve and cylinder piston being cooperatively actuated by pressure of the lubricant flowing in either direction in said supply line, a second cylindrical passage connecting said body member inlets and communicating with the cylinder, and valve means controlled by the pressure of lubricant entering said body member inlets adapted to close said second cylindrical passage to the flow of lubricant therethrough and to direct lubricant flowing from the cylinder to pass out of the port of the body member opposite to that in which lubricant is then entering the device.

10. A feeder for lubricating bearings, comprising a cylindrical body portion, pierced caps for closing the ends of said body portion adapted for fluid connection with lubricant conveying means and constituting inlet and outlet ports for said main body portion for obtaining lubricant from and discharging lubricant to said lubricant conveying means, a cylinder having removable ends, a fluid pressure operated piston in said cylinder having axial extensions on each side thereof, a passageway leading from one inlet to the other, a duct near each end of said passageway communicating with each end portion of the cylinder, a discharge port in said passageway adapted for fluid connection to a bearing, a dumbbell valve in said passageway controlled by the pressure of the lubricant entering said feeder and controlling the lubricant supplied to said cylinder and the discharge of lubricant through said discharge port, a second passageway leading from one inlet to the other, a duct communicating with the central portion of the cylinder and with said second passageway, a dumbbell valve in said last mentioned passageway controlled by pressure of the lubricant entering either one of said inlets and controlling the flow of lubricant received from the cylinder, valve chambers adjacent each end of said second passageway, each valve chamber communicating with the inlet port at its end and with said second passageway, a fluid pressure operated valve in each of said valve chambers adapted to be closed to its respective inlet port by the pressure of lubricant entering said port and adapted to be opened to the outlet port to the lubricant conveying means.

11. A feeder for lubricating bearings comprising a body having a cylinder and a piston reciprocable in said cylinder, said body having two openings, one serving as a loading opening while the other serves as a discharge opening and vice versa to a lubricant conveying means capable of conducting lubricant under pressure in either direction, a discharge port communicating with said body and adapted for connection to a bearing, valve means for directing lubricant entering said device under pressure through one of said openings into said body to actuate said piston and to direct lubricant being forced out of said body from the other side of said piston to the discharge port and a valve controlled passageway connecting said openings and communicating with said cylinder, and bypass means for directing lubricant flowing from said cylinder through said body to the other opening after each stroke of the piston.

12. A tell-tale lubricating device which directs lubricant received from a lubricant conveying means connected to a source of supply adapted to develop pressure and which first discharges an increment of lubricant to the bearing to which it is connected and then directs the lubricant therethrough and to the lubricant conveying means leading to another device, comprising a main body portion having two openings serving alternately as inlets and outlets to the fluid conveying means, three cylindrical passageways, one of said cylindrical passageways being provided with a discharge port adapted for connection to a bearing, another of said cylindrical passageways having removable plugs in its end portions and comprising a measuring chamber, the other of said cylindrical passageways having a by-pass duct near each end thereof, each duct being adapted to communicate with its respective openings of the main body, a fluid operated piston reciprocable in said measuring chamber, ducts communicating between the end portions of said measuring chamber and said first named cylindrical passageway and valve means in said first named cylindrical passageway controlled by and adapted to control the lubricant supplied to said measuring chamber and controlling the discharge of lubricant to the bearing, a duct communicating between said measuring chamber and the cylindrical passageway having the by-pass ducts, valve means in said last mentioned cylindrical passageway adapted to close said passageway and one of the by-pass ducts to the flow of lubricant from the opening serving as an inlet and adapted to open the other by-pass duct to the flow of lubricant entering said last named passageway from the cylinder.

13. A lubricating device comprising a body portion having two ports serving alternately as inlet and outlet ports to a lubricant pressure supply line, and a discharge port adapted for connection to a bearing, a piston chamber communicating with each of said alternate inlet and outlet ports and with said discharge port, and having an additional outlet, a piston in said piston chamber, said additional outlet being adapted to permit lubricant to flow out of said cylinder after each piston stroke, a passageway communicating with said additional cylinder outlet and with each of said alternate body inlet and outlet ports and valve means adapted to close said passageway at the end communicating with the port through which lubricant is entering and to direct lubricant entering said passageway to the other body port, and valve means controlled by lubricant entering said two body ports and controlling the lubricant supplied to said device under pressure and directing the increment of lubricant to be discharged from the device to the discharge port.

14. A lubricant device of the class described comprising a cylindrical body, a cylinder in said body, a fluid pressure actuated piston in said cylinder, two ports in said body each adapted to alternately receive lubricant from and to discharge lubricant to a fluid conveying line, a discharge port in said body member adapted to be connected to a bearing, a communicating passageway between said two ports also communicating with the discharge port and the cylinder, and valve means controlled by pressure of the lubricant entering either one of said body ports for directing lubricant into said cylinder on one side of said piston for directing lubricant out of said cylinder on the other side of said piston to the discharge port, a second communicating passageway between said body ports, a communicating duct connecting said passageway with the cylinder and adapted to be opened to flow of lubricant received from the fluid conveying line after the piston has forced a measured quantity of lubricant out of the discharge port, a valve controlled bypass chamber near each end of said second communicating passageway, each of said last named chambers communicating with said duct and with one of the two body ports, each of said valve controlled chambers being adapted to be closed to said second communicating passageway when lubricant under pressure enters the body port with which it communicates.

15. A feeder for lubricating bearings comprising a body having a cylinder and a piston reciprocable in said cylinder, said body having two openings each serving alternately as loading openings and discharge openings to a lubricant conveying means capable of conducting lubricant under pressure in either direction, a discharge port communicating with said body and adapted for connection to a bearing, valve means for directing lubricant entering said device under pressure through one of said openings into said body to actuate said piston and to direct lubricant being forced out of said body from the other side of said piston to the discharge port, a valve controlled passageway connecting said openings and communicating with said cylinder and valve controlled bypass means for directing lubricant flowing from said cylinder to the other opening after each stroke of the piston.

16. A tell-tale lubricating device which directs lubricant received from a lubricant conveying means connected to a source of supply adapted to develop pressure and which first discharges an increment of lubricant to the bearing to which it is connected and then directs the lubricant therethrough and to the lubricant conveying means, comprising a main body portion having two openings serving alternately as inlets and outlets to the fluid conveying means, three cylindrical passageways, one of said cylindrical passageways being provided with a discharge port adapted for connection to a bearing, another of said cylindrical passageways having removable plugs in its end portions and comprising a measuring chamber, and a fluid pressure operated piston reciprocable in said measuring chamber, the other of said cylindrical passageways having a by-pass duct near each end thereof communicating with the respective openings of the main body, ducts communicating between the end portions of said measuring chamber and said first named cylindrical passageway controlled by and adapted to control the lubricant supplied to said measuring chamber and controlling the discharge of lubricant to the bearing, a duct communicating between said measuring chamber and the cylindrical passageway having the by-pass ducts, valve means in said last mentioned cylindrical passageway adapted to close said passageway and one of the by-pass ducts to the flow of lubricant from the opening serving as an inlet and adapted to open the other bypass duct to the flow of lubricant entering said last named passageway from the cylinder.

17. In a feeder of the character described, two ports serving alternately as inlet and outlet ports, a measuring chamber, a reciprocable piston in said measuring chamber, a discharge port, a cylindrical passageway enlarged at each end to accommodate spring pressed valves for which seats are provided at the inner ends of said passage enlargements, such passageway communicating with said measuring chamber and with each of said first two mentioned ports, each of said valves normally resting upon its seat, each of said valve chambers having a duct communicating therewith and with one of said first mentioned ports, each such duct directing lubricant around the valve whenever the valve is off its seat, a second cylindrical passageway communicating with each of said first two mentioned ports and with each end of said measuring chamber and also communicating with said discharge port, valve means for directing lubricant entering said last mentioned cylindrical passageway from one of said first two mentioned ports to pass into said measuring chamber on one side of the piston and for directing lubricant discharged from the measuring chamber on the other side of the piston to pass through said discharge port.

DAVID R. HILLIS.